(12) United States Patent
Tang (10) Patent No.: US 6,657,460 B2
(45) Date of Patent: Dec. 2, 2003

(54) SPATIALLY FILTERED DATA BUS DRIVERS AND RECEIVERS AND METHOD OF OPERATING SAME

(75) Inventor: Benjamin Tang, Hawthorne, CA (US)

(73) Assignee: Primarion, Inc., Tempe, AZ (US)

( * ) Notice: Subject to any disclaimer, the term of this patent is extended or adjusted under 35 U.S.C. 154(b) by 0 days.

(21) Appl. No.: 10/056,762

(22) Filed: Jan. 23, 2002

(65) Prior Publication Data

US 2002/0113622 A1 Aug. 22, 2002

Related U.S. Application Data (60) Provisional application No. 60/263,394, filed on Jan. 23, 2001, provisional application No. 60/263,477, filed on Jan. 23, 2001, and provisional application No. 60/263,478, filed on Jan. 23, 2001.

(51) Int. Cl.[7] ................... H03K 19/0185; H03K 17/16
(52) U.S. Cl. .................. 326/86; 326/83; 326/24; 326/27; 333/103
(58) Field of Search .................. 326/86, 83, 121, 326/17, 23, 24, 27; 333/103

(56) References Cited

U.S. PATENT DOCUMENTS

| | | | |
|---|---|---|---|
| 5,583,457 A | * | 12/1996 | Horiguchi et al. .......... 326/121 |
| 5,933,021 A | | 8/1999 | Mohd |
| 6,008,705 A | | 12/1999 | Ghoshal |
| 6,285,208 B1 | * | 9/2001 | Ohkubo ....................... 326/15 |
| 6,288,573 B1 | * | 9/2001 | Tanizaki et al. ............ 326/120 |

FOREIGN PATENT DOCUMENTS

EP    0 398 098 A2    11/1990

* cited by examiner

*Primary Examiner*—Daniel Chang
(74) *Attorney, Agent, or Firm*—Theodore E. Galanthay (57) ABSTRACT

The present invention is directed to an improved system and method for transmitting and receiving digital data. In order to counter the spatial filtering effects of a digital data bus, data is spatially filtered by a driver before being sent on the digital data bus to its destination. In the alternative, the data may be spatially filtered by a receiver after being sent on the digital data bus. The spatial filter may include one or more current-limiting elements, such as a resistor or a transistor, coupled between the power supply and the various buffers on the bus. Such a configuration results in a lowering of the crosstalk and ground bounce present between adjacent lines on a data bus.

20 Claims, 9 Drawing Sheets

SPATIALLY FILTERED DATA BUS DRIVERS AND RECEIVERS AND METHOD OF OPERATING SAME

CROSS REFERENCE TO RELATED APPLICATIONS

This application claims priority from U.S. Provisional Application No. 60/263,394, filed Jan. 23, 2001, U.S. Provisional Application No. 60/263,477, filed Jan. 23, 2001, and U.S. Provisional Application No. 60/263,478 filed Jan. 23, 2001.

FIELD OF INVENTION

The present invention generally relates to microelectronic devices. More particularly, the present invention relates to bus drivers and receivers with improved signal integrity.

BACKGROUND OF THE INVENTION

In digital systems, data is typically represented by a group of bits representing the value of that data, where the bit value is typically a logical high or a logical low. A logical high level is typically represented by a high-voltage level, such as that of the positive power supply, and a logical low level is typically represented by a low-voltage level, such as that of the device ground.

The processing of digital data typically involves transmitting signals representing individual bits from one digital block or subsystem to another digital block or subsystem. Since the representation of data contains of multiple bits (such as 8-bit words or 16-bit words), a digital bus typically transmits a parallel set of bits from one physical location to another using multiple traces.

In a typical digital system, the timing of the system may be critical. The signals are typically configured to recognize transitions between logical levels only at particular times. In addition, the voltage levels of the system may also be critical. For example, if 0 volts represents a logical low signal and 3.3 volts represents a logical high signal, a voltage level outside of predetermined voltage tolerances is ambiguous (e.g., it may not be possible to determine whether a voltage level of 1.6 volts represents a logical low or a logical high level.)

Figure 1:
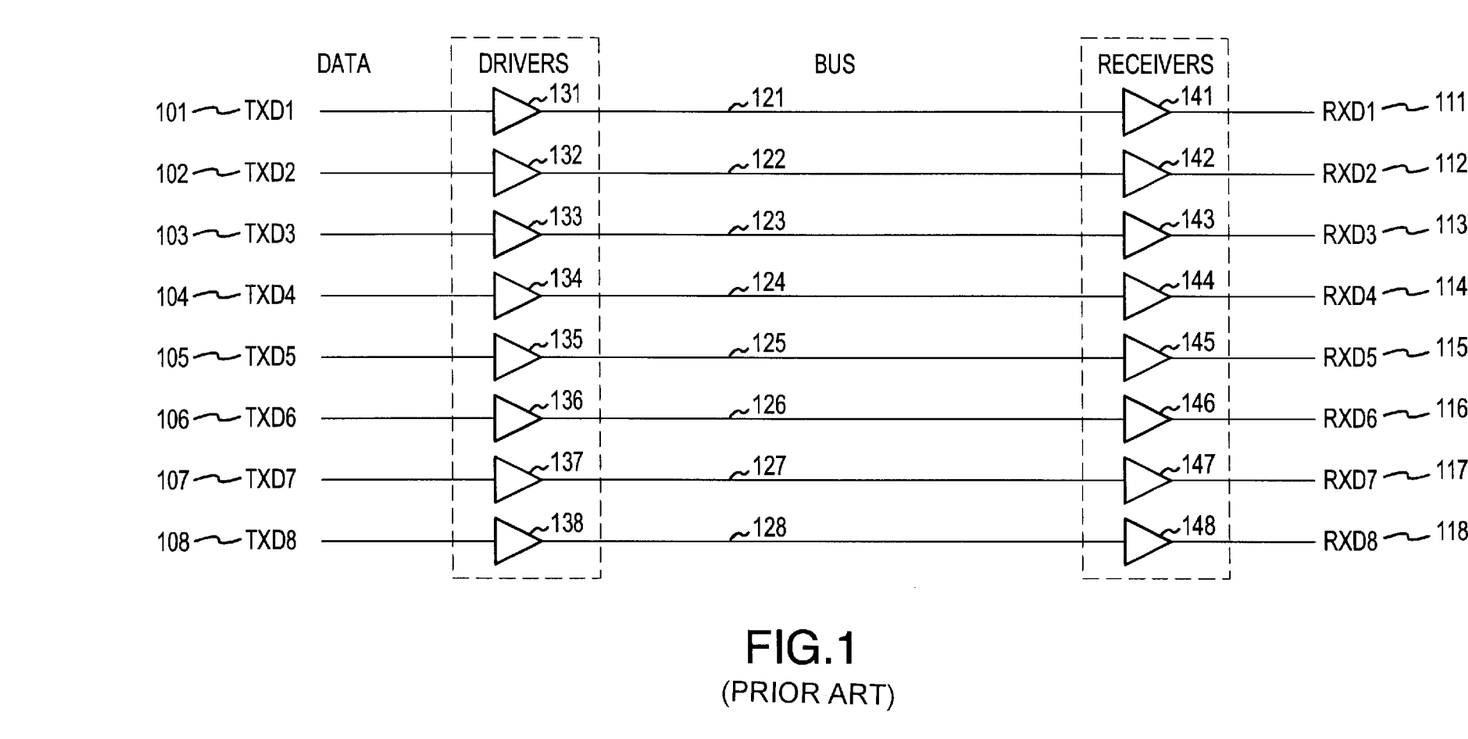
FIG. 1 depicts a schematic diagram of a typical 8-bit data bus.

FIG. 1 illustrates a typical data bus where eight digital bits are transmitted from one location, represented by signals 101–108, to another location, represented by signals 111–118. The medium for transmission in FIG. 1 is an 8-bit bus having traces (121–128). In order to transmit the signal over the bus, drivers 131–138 are used to generate the proper signals to send via bus 121–128, and receivers 141–148 are used to detect the signal on the bus to generate the appropriate digital signals 111–118.

While the data bus has been described as taking the form of traces 121–128, the bus may take one of several different forms, such as traces on an integrated circuit, on a hybrid or package, a printed circuit board, a ribbon cable, or a backplane, depending on the location of the digital blocks or subsystems. Furthermore, the data bus may consist of a single destination and set of receivers or multiple destinations and sets of receivers.

Drivers 131–138 may include buffers (non-inverting) or inverters. Similarly, receivers 141–148 may consist of buffers or inverters, and digital signals 111–118, the respective outputs from receivers 141–148, may consist of an equivalent data representation of signals 101–108.

When a digital signal (representing the value of a single bit) switches from low to high, it may affect the signal on traces in physical proximity. Such spatial effects may include crosstalk, wherein the signal on one trace is coupled to the signal on another trace, or ground or supply bounce, wherein the voltage at ground and the power supply is not maintained at a relatively constant value due to the current flow used to effect the switching.

Figure 2:
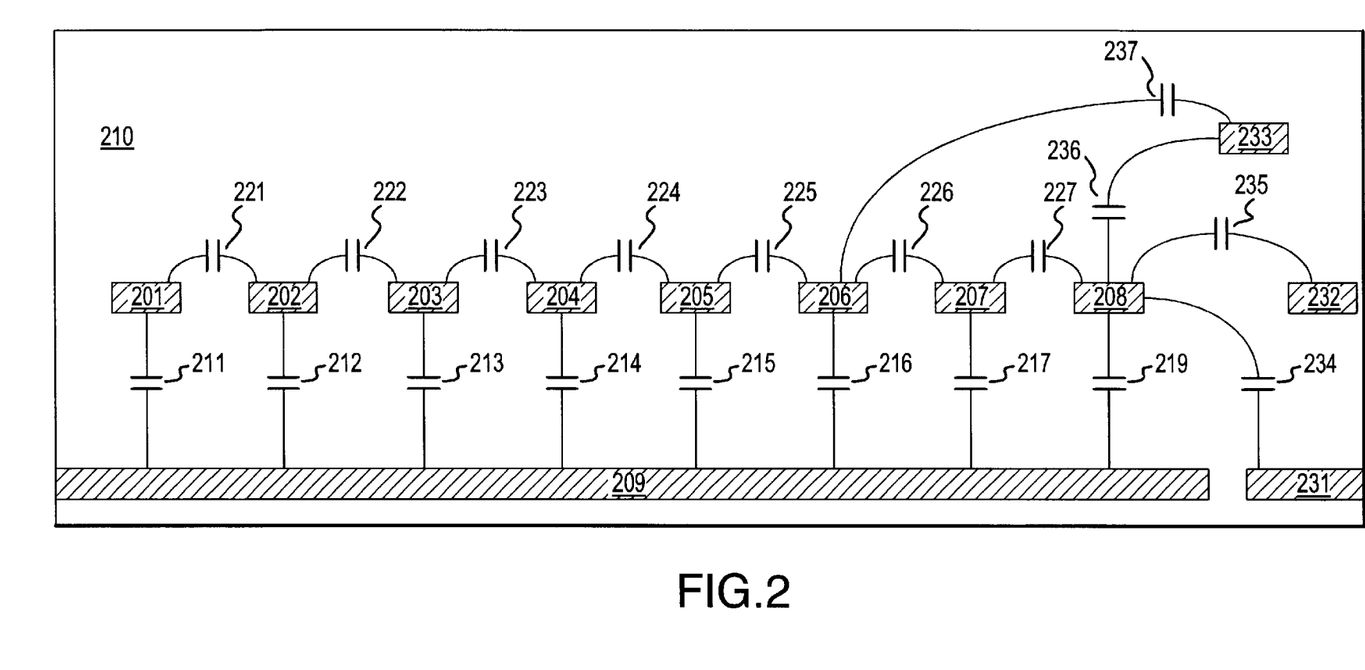
FIG. 2 illustrates a cross-section of a typical data bus, including parasitic capacitances.

FIG. 2 illustrates a 2-dimensional cross-section of a typical 8-bit data bus. The data bus includes traces 201–208. The electrical characteristics of the bus depend on the physical dimensions of the traces (including the width, height, and spacing of the traces), the distance from the traces to a ground plane 209, and the characteristics of the dielectric material 210 which surrounds the traces. As noted above, the data bus may take various forms, such as traces on an integrated circuit, on a hybrid or package, a printed circuit board, a ribbon cable, or a backplane. However, for purposes of FIG. 2, they will be referred to as traces.

For typical chip and board interconnects, the electrical characteristics of the bus are dominated by the parasitic capacitance of the traces. Parasitic capacitance is the undesired capacitance that may result from the physical proximity of two electrical conductors. The parasitic capacitance may result from the proximity of a signal trace (201–208) to ground (209), as represented by parasitic capacitances 211–219, or from the proximity of one trace (201–208) to another trace (201–208), as represented by parasitic capacitances 221–227. There may also be additional parasitic capacitances due to other signal traces such as 231–233, represented by parasitic capacitances 234–237. For well-designed buses, however, the placement of traces 201–208 is often configured such that parasitic capacitances 231–233 are much less significant than the parasitic capacitance to ground (211–219) and the parasitic capacitance between traces (221–227).

Figure 3:
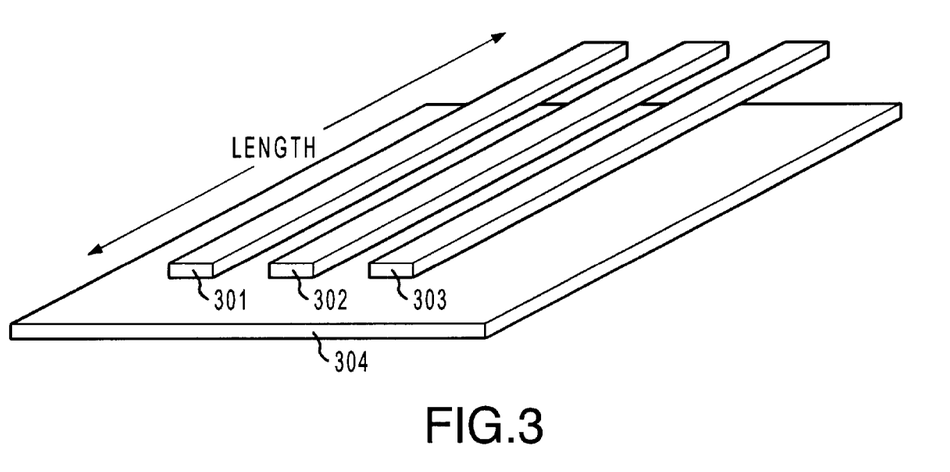
FIG. 3 illustrates a perspective view of three traces on 3-bits of a data bus.

FIG. 3 illustrates a three-dimensional view of a 3-bit bus with signal traces 301–303 and ground plane 304, similar to the 8-bit bus cross-section shown in FIG. 2. FIG. 3 illustrates that the length of the traces on a bus has an effect on the magnitude of the parasitic capacitances to ground and between traces, as the longer the traces are, the more area for which a capacitance to form. In general, the parasitic capacitances are proportional to the length of a trace, such that long buses have higher parasitic capacitance, but the relative ratio of those values are mostly dependent on the cross-sectional spacing.

Through the parasitic capacitance and inductance, the waveform on a signal trace will have an effect on adjacent traces; thus, the traces on the bus do not behave independently, but may be at least partially dependent on the signal waveforms on all traces. More particularly, a change in voltage or current in a trace can affect an adjacent trace through the parasitic capacitance and mutual inductance coupling. For simplification, the dominant terms for each trace can be considered for most practical cases to be the parasitic capacitance to ground and the parasitic capacitances to immediately adjacent traces, and the bus can be thought of consisting of a multiple port network or spatial filter.

The coupling results in undesirable deviations, such as crosstalk, to the waveform at the receiver such that the maximum operating frequency of the signals is typically limited for successful transmission and reception over the bus. Operating frequencies faster than the maximum operating frequency may result in difficulty in determining the proper state (logical high or logical low) of the various bits.

In addition, the current drawn by the buffers during signal transitions will vary depending on the number of signals transitioning simultaneously in the same direction, such as from logical-low to logical-high. This change in current leads to a variation in the voltage supply or the ground, resulting in a change in the signal waveforms, known as ground bounce.

When several devices are nearly simultaneously (i.e., during the same computing clock period) transitioning from a logical-low to a logical-high, and several other devices are also transitioning from a logical-high to a logical-low, the ground bounce presented is minimal, as the opposite switching directions of the devices may tend to cancel each other out, whereas when most signals transition in the same direction, the ground bounce is greater. Furthermore, when adjacent signals switch in opposite directions, coupling due to crosstalk is increased, resulting in smaller amplitudes and degraded transition times, making it more difficult to determine the correct state for each particular signal.

Figure 8:
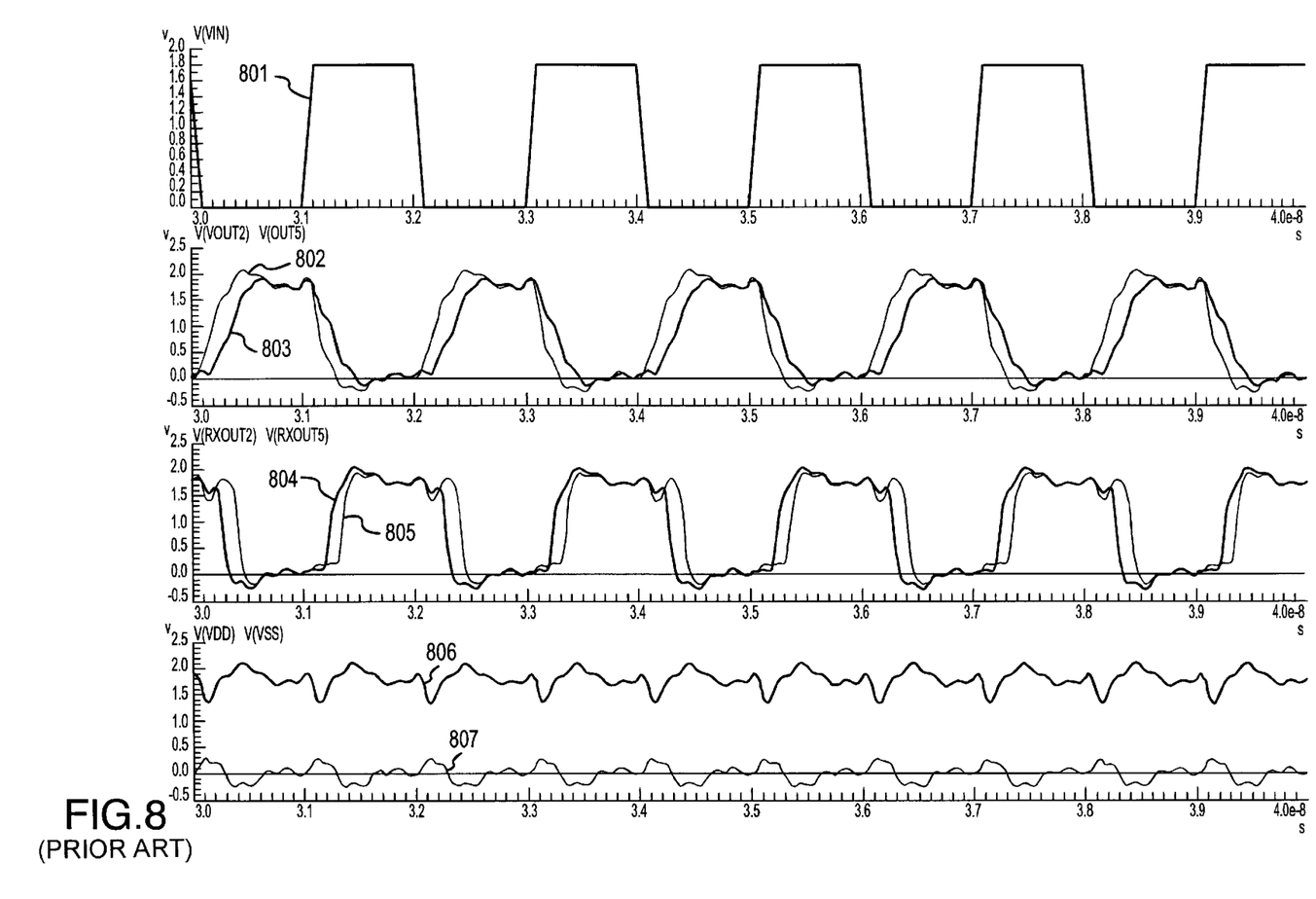
FIG. 8 illustrates exemplary waveforms from data bus systems of the prior art.

With reference to FIG. 8, several exemplary waveforms showing the possible effect of crosstalk and ground bounce are presented. In FIG. 8, an 8-bit bus (such as the one illustrated in FIG. 1) is modeled as a multiple-port network. The supply voltage and ground are modeled as series resistance and inductance in order to account for ground bounce.

The input waveform 801 is applied to input ports 101, 102, 103, and 105, while the logical inverse of input waveform 801 is applied to input ports 104, 106, and 107. Waveform 802 illustrates the signal on trace 122, while waveform 803 corresponds to the signal on trace 125. Ideally, trace 122 and 125 have the same logical values and transition nearly simultaneously. However, in the illustrated examples, the traces adjacent to trace 122 (i.e., trace 121 and trace 123) transition in the same direction. In contrast, the traces adjacent to trace 125 (i.e., trace 124 and trace 126) transition in the opposite direction because of the logical inverse signal at inputs ports 104 and 106. Thus, the result is that the signal represented by waveform 803 lags in time behind that of waveform 802.

Waveform 804 illustrates the output signal from receiver 112 and waveform 805 illustrates the output signal from receiver 115. As above, the signal represented by waveform 805 lags behind that of waveform 804. Such a time difference between the signals may result in timing failures. A timing failure may occur if the transition between a logical high level and a logical low level (or vice versa) occurs too late for a digital device to recognize the change, thus leading to an incorrect value.

Waveforms 806 and 807 depict the voltages at the power supply and the device ground. It can be seen that, instead of having a relatively constant value, the voltages fluctuate, which can result in logic failure due to either insufficient amplitude or timing margin if such fluctuations become too large.

Typical techniques for improving the maximum operating frequency include increasing the drive and amplitude of the buffers and slowing down the transition times to reduce the effects of crosstalk and ground bounce, but these provide only limited mitigation of the signal degradation. In state-of-the-art devices, as clock frequencies increase, device geometries decrease, and voltage supplies decrease, this problem becomes increasingly significant. More particularly, as clock frequencies increase, there is less time available to discern the correct value of each bit. A reduced device geometry (e.g., a 0.13 micron device in lieu of 0.25 micron device) places the various components and trace lines closer, possibly exacerbating the crosstalk problems described above. A reduced voltage supply (e.g., a 1.5 volt supply in lieu of a 5.0 volt supply), reduces the difference between signals with a logical high level and signals with a logical low level, possibly increasing the difficulty in discerning the correct value of each bit.

Accordingly, improved method and apparatus for reducing crosstalk and ground bounce within a data bus are desired.

SUMMARY OF THE INVENTION

The present invention is directed to a method and system for alleviating the above-described problems. A method in accordance with one embodiment of the present invention includes transmitting the data over the digital data bus using a spatially-filtered driver for each bit being transmitted such that the spatial effects of the digital data bus are countered. In accordance with an alternative embodiment, a method of transmitting signals employs the use of a spatially-filtered receiver for each bit such that the spatial effects of the digital data bus are countered. In accordance with another alternative embodiment, a method of transmitting signals may combine the use of a spatially-filtered driver and a spatially-filtered receiver for transmitting each bit.

A system of drivers in accordance with the present invention includes a first driver and a second driver. Both drivers are coupled to a positive power supply through a current-limiting device. Both drivers are also coupled to a ground though a second current-limiting device. The first current-limiting device is operable for a first type of transition while the second current-limiting device is operable for a second type of transition.

A system of receivers in accordance with the present invention includes a first receiver and a second receiver. A first current-limiting device is coupled to a voltage supply and to the first receiver. A second current-limiting device is coupled to the first receiver and to a ground. A third current-limiting device is coupled to a voltage supply and to both the first receiver and the second receiver. A fourth current-limiting device is coupled to a ground and to both the first receiver and the second receiver. A first capacitor may coupled the first and second receiver. This first capacitor may also be coupled to a power supply. A second capacitor may coupled the first and second receiver. This second capacitor may also be coupled to a ground. The first and third current-limiting devices are operable for a first type of transition while the second and fourth current-limiting devices are operable for a second type of transition.

An alternative driver system of the present invention includes a first and second driver. A first current-limiting device is coupled to a voltage supply and to the first driver. A second current-limiting device is coupled to a ground and to the first driver. A third current-limiting device is coupled to a voltage supply and to both the first driver and the second driver. A fourth current-limiting device is coupled to a ground and to both the first driver and the second driver.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

Those skilled in the art will appreciate that elements in the figure are illustrated for simplicity and clarity and have not necessarily been drawn to scale. For example, the dimensions of some of the elements in the figure may have been exaggerated relative to other elements to help to improve understanding of embodiments of the present invention.

DETAILED DESCRIPTION

The present invention may be described herein in terms of various functional components and various processing steps. It should be appreciated that such functional components may be realized by any number of hardware or structural components configured to perform the specified functions. For purposes of illustration only, exemplary embodiments of the present invention will be described herein in connection with drivers and receivers. Further, it should be noted that, while various components may be suitably coupled or connected to other components within exemplary circuits, such connections and couplings can be realized by a direct connection between components, or by a connection through other components and devices located therebetween.

Figure 4:
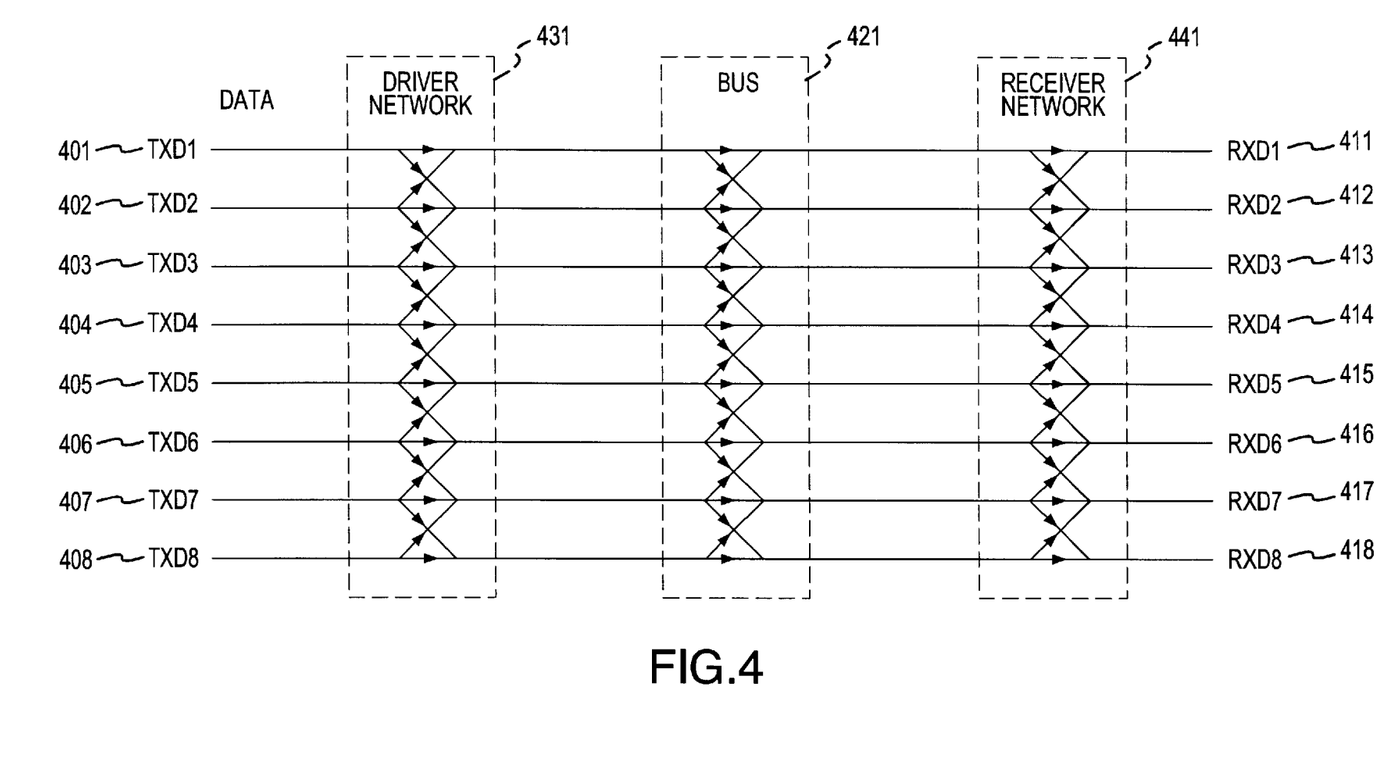
FIG. 4 illustrates an overview diagram of a spatial filter architecture for data bus drivers and receivers in accordance with the present invention.

A system in accordance with the present invention includes spatially-filtered drivers or spatially-filtered receivers to compensate for the interaction between various electrical signals (e.g., parasitic capacitance and mutual inductance). With reference to FIG. 4, such a new approach to is illustrated. As in FIG. 1, the object is to transmit bits of digital data from nodes 401–408 to nodes 411–418 through data bus 421. Data bus 421 is illustrated as a multiple port spatial filter that models the interactive coupling between traces (e.g., parasitic capacitance and mutual inductance). For the data to be transmitted effectively, it may be desirable to counter the effect of this coupling such that the bus may be operated with the highest possible efficiency, as discussed in more detail below.

A driver network (431) or a receiver network (441) can be used individually or jointly configured such that they implement an inverse spatial filter relative to the bus 421, thus countering various degradations described above. This configuration allows the data bus to operate at higher frequency and with more margin than if simple drivers and receivers such as those illustrated in FIG. 1 are used to drive or receive signals from the same bus.

As described above, the worst case ground bounce occurs when all bits swing simultaneously in the same direction. Conversely, the crosstalk is maximized when a bit changes in the opposite direction of the majority of the bits on the bus. In accordance with the various embodiments of the present invention, the spatial effects of the drivers or receivers may be realized through the sharing of a current-limiting resistor among multiple buffers. In such a case, the transitions between different logical levels are optimized for the switching profile: limiting transition time when ground bounce is more significant and allowing faster transitions when crosstalk from neighbors is more significant. More particularly, a system in accordance with an embodiment of the present invention may be configured such that bits switching from low to high do not share a current supply with bits switching from high to low.

Figure 5:
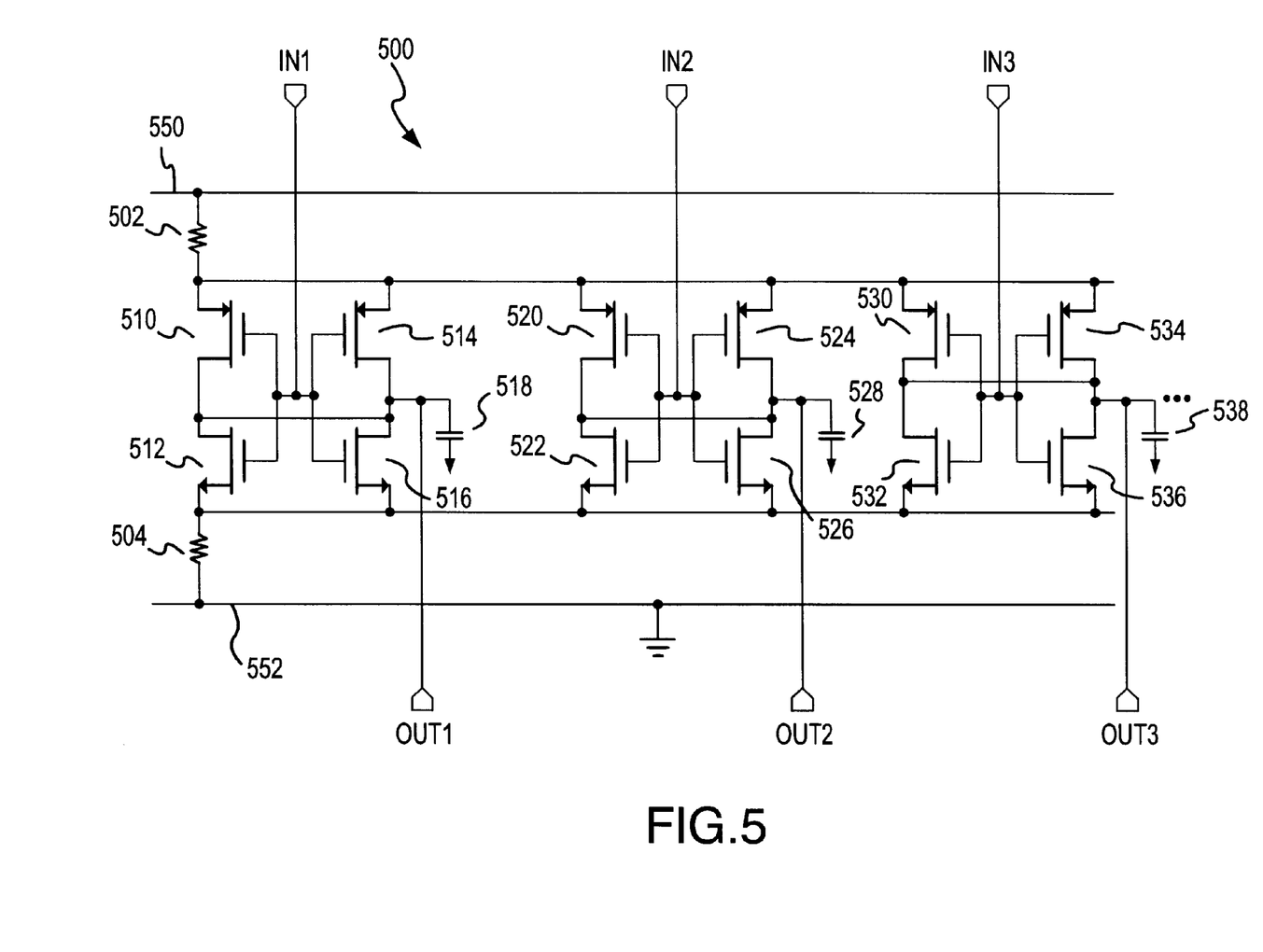
FIG. 5 illustrates a schematic diagram of an exemplary driver configuration.

FIG. 5 illustrates an exemplary series of drivers suitable for use in a data transmission system of the present invention in accordance with an exemplary embodiment. Although three drivers are illustrated in FIG. 5, any number of drivers may suitably be coupled together in accordance with various embodiments of the invention. Illustrated are a first driver with input IN1 and output OUT1 comprising transistors 510, 512, 514, and 516, and a capacitor 518; a second driver with an input IN2 and output OUT2 comprising transistors 520, 522, 524, and 526, and a capacitor 528; and a third driver with an input IN3 and output OUT3 comprising transistors 530, 532, 534, and 536, and a capacitor 538. Also shown are voltage source 550, ground 552, a first current-limiting device 502, and a second current-limiting device 504 (e.g., a resistor). It should be understood that a digital signal is applied to the input ports (IN1, IN2, IN3) and the signal from the output ports (OUT1, OUT2, and OUT3) is transmitted along the traces of the bus.

Because the drivers are tied together through a current-limiting device, when the multiple drivers switch simultaneously in the same direction (e.g., from logical low to logical high or logical high to logical low), they share supply current through the current-limiting devices. Each of the drivers is supplied with less current then they would be without the current-limiting device, because the current-limiting device slows down the transition between logical levels. But, because the drivers are all switching in the same direction, such a slowing down of the transition is acceptable, because the result can be resolved relatively easily.

When drivers are switching in opposite directions (i.e., some drivers are switching from logical low to logical high and some are switching from logical high to logical low), less current loading is present than when drivers are switching in the same direction, because the supply current is not being shared by as many devices (only current-limiting resistor 502 is operable for a low to high transition, while only current-limiting resistor 504 operates during a high to low transition). The transition from low to high and the transition from high to low occurs faster in this situation because a greater amount of current is available to each driver. Therefore, the transition is easier to resolve than in the previous art, because of the increased speed of the transition.

Another aspect of the present invention involves a method of and apparatus for implementing buffers for bus applications which take advantage of the bus characteristics to improve performance, while minimizing crosstalk and ground bounce. As noted above, the worst case ground bounce occurs when all switches swing simultaneously either from low to high or from high to low. Conversely, the crosstalk is maximized when a switch swings in the opposite direction to the majority of switches on the bus. Through the sharing of a current-limiting resistor among multiple buffers in accordance with an embodiment of the present invention, the transitions may be optimized for the switching profile, limiting transition time when ground bounce is more significant and allowing faster transitions when crosstalk from neighbors is more significant.

Because busses are typically include 8 to 128 bits traces or lines, it should be understood that, in typical situations, the behavior of a driver or receiver typically affects an adjacent driver or receiver more than it affects drivers or receivers that are farther apart (i.e., drivers that are physically close together, such as those representing bits 6 and 7). Therefore, one exemplary method to reduce crosstalk and ground bounce is to share current solely among immediately adjacent drivers and receivers.

Since crosstalk is dominated by switching on adjacent bit lines, and bus routing tends to keep all signals relative order, spatial filtering can be used to compensate for neighbor crosstalk. In this case, a spatial filter may provide some additional high frequency boost, increasing the driver transition time and amplitude when adjacent neighbors switch in opposite directions and reducing the driver transition time and amplitude when adjacent neighboring drivers simultaneously switch in the same direction.

Figure 7:
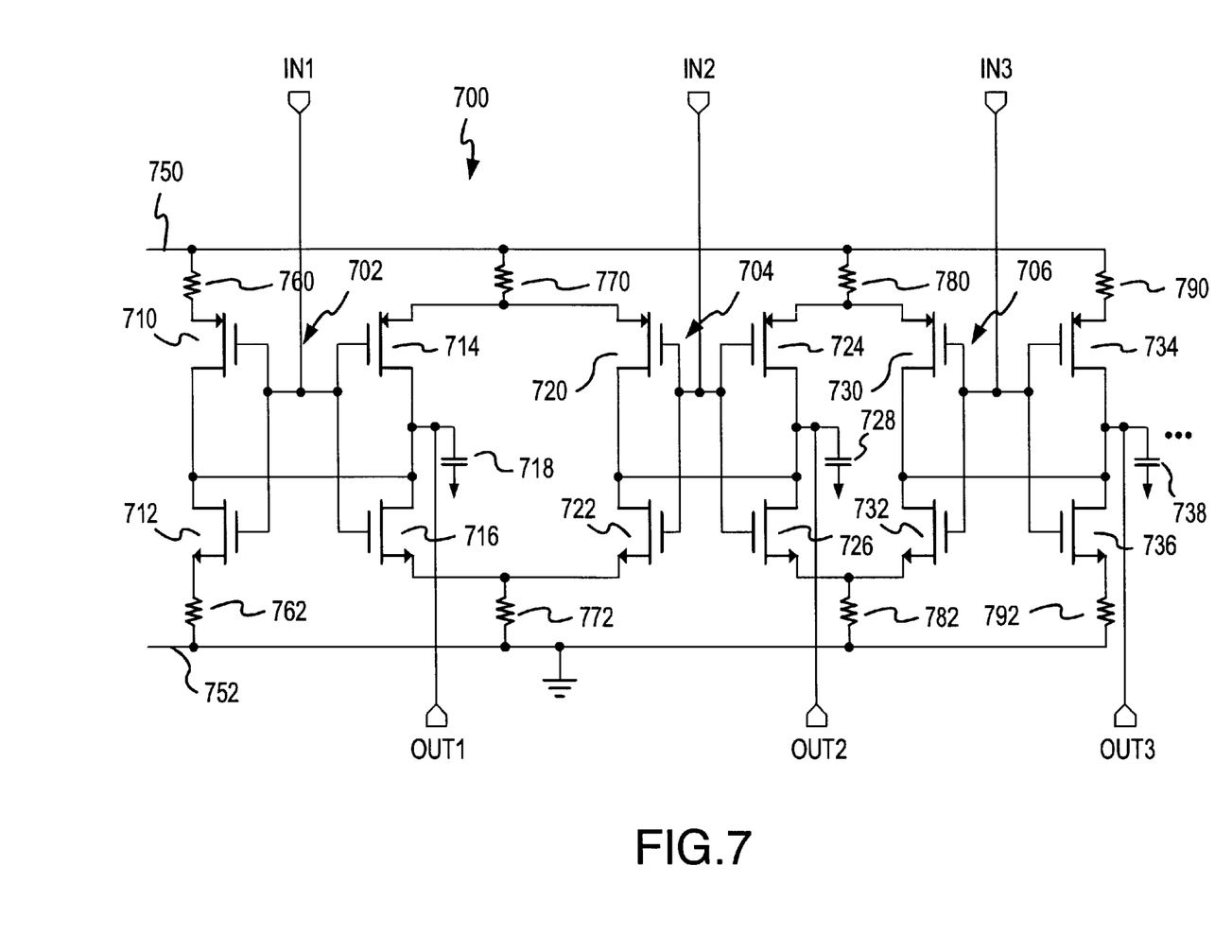
FIG. 7 illustrates a schematic diagram of an exemplary receiver configuration in accordance with the present invention.

FIG. 7 illustrates an alternative exemplary circuit 700 in accordance with the present invention. It should be understood that circuit 700 may be used as either as a receiver or as a driver. Circuit 700 includes a first driver/receiver 702 with an input IN1 and an output OUT1 comprising transistors 710, 712, 714, and 716, and a capacitor 718; a second driver/receiver 704 with an input IN2 and an output OUT2 comprising transistors 720, 722, 724, and 726, and a capacitor 728; and a third driver/receiver 706 with an input IN3 and an output OUT3 comprising transistors 730, 732, 734, and 736, and a capacitor 738. Also shown are a voltage supply bus 750 and a ground bus 752. It should be understood that the busses may contain drivers/receivers for any desired number of bits (e.g., from 8 to 128 bits). Therefore, there may be any number (e.g., from 8 to 128) of drivers/receivers on the bus.

Also present in circuit 700 are current-limiting devices 760 and 762, coupled to a portion of first driver/receiver 702; current-limiting devices 770 and 772, coupled to a portion of both first driver/receiver 702 and second driver/receiver 704; current-limiting devices 780 and 782, coupled to a portion of both second driver/receiver 704 and third driver/receiver 706; and current-limiting devices 790 and 792, coupled to a portion of third driver/receiver 706. It should be noted that the configuration of drivers/receivers 702, 704, and 706 is merely exemplary and not intended to limit the present invention to drivers/receivers of the configuration shown in the FIG. 7.

The use of current-limiting devices, such as resistors, for each adjacent pair of drivers/receivers results in the supply current being substantially shared only between adjacent pairs of drivers/receivers, rather than being shared by all of the drivers/receivers on a bus.

Because pairs of drivers/receivers are tied together through a current-limiting device, such as resistor 770 or resistor 772, when each of the pair of drivers/receivers switch from low to high or from high to low at the same time, the drivers/receivers share current through the current-limiting device. Each of the drivers/receivers is supplied with less current, because of the current-limiting device, slowing down the initial transition. But, because the adjacent drivers/receivers are switching in the same direction, such a slowing down of the transition is acceptable, because the intended logical level is easily resolved. Because there are no neighboring drivers/receivers switching in the opposite direction, while the speed of the transition may be affected, the level of the signal is not greatly affected.

When each of a pair of adjacent drivers/receivers are simultaneously switching in opposite directions (i.e., one driver/receiver switching from high to low and the other driver/receiver switching from low to high), less current loading is present because the current is only being shared between two drivers/receivers and the transition from low-to-high and the transition from high-to-low occurs faster because a greater amount of current is available to each drivers/receivers. Therefore, the transition is easier to resolve because of the increased speed of the transition.

An alternative embodiment of the present invention further includes capacitive coupling of adjacent receivers. As described above, the worst case ground bounce occurs when all switches swing simultaneously in the same direction. Conversely, the crosstalk is maximized when a signal switches in the opposite direction to the majority of the bus. As described above, in the case of drivers, it is desirable to change the level of the signal being output. In the case of receivers, it is desirable to change the threshold (the level that indicates a change of signal) of the receivers.

Figure 6:
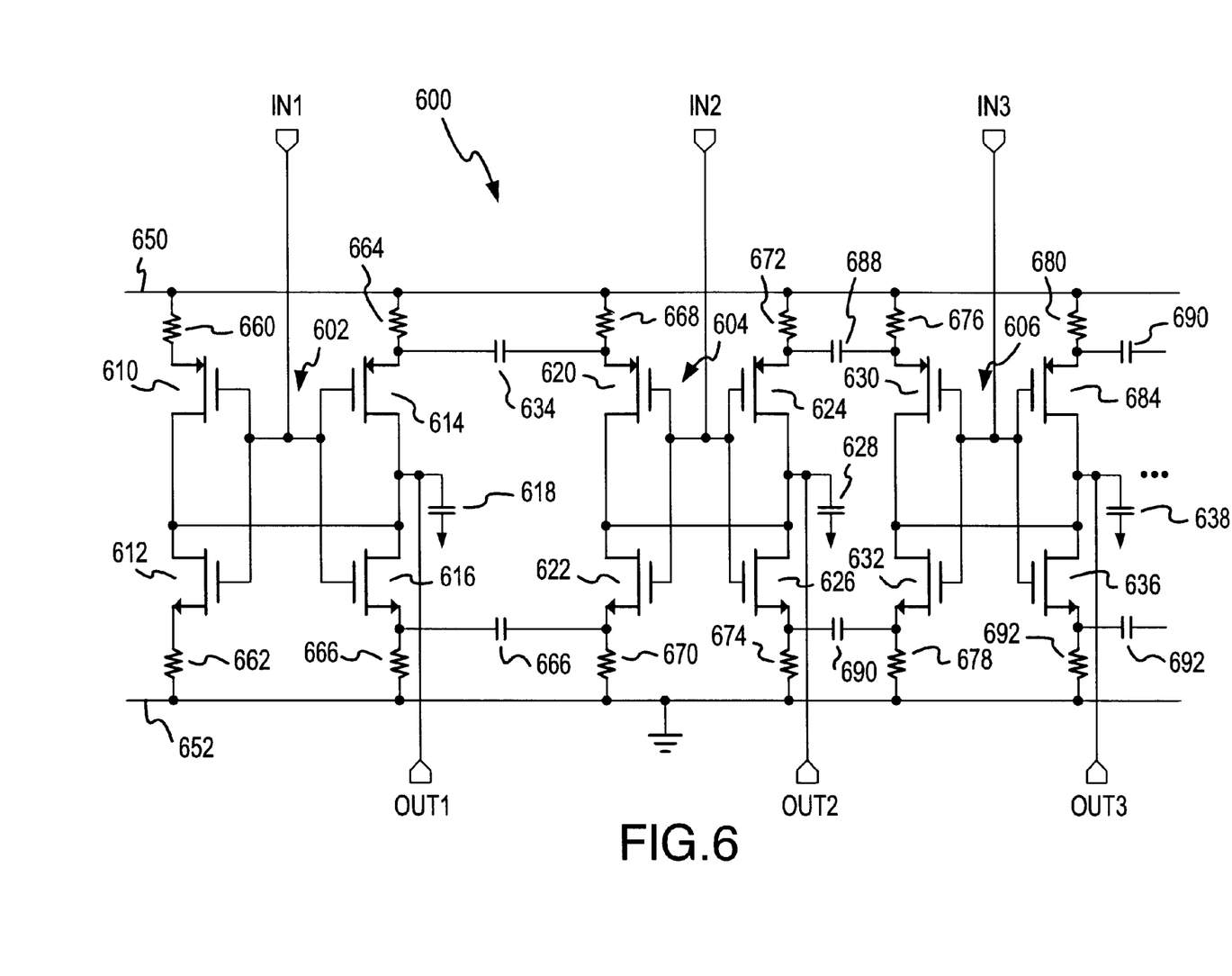
FIG. 6 illustrates a schematic diagram of exemplary driver/receiver configuration in accordance with the present invention.

FIG. 6 illustrates an exemplary circuit 600 in accordance with another exemplary embodiment of the present invention. Receiver 600 includes a first receiver 602 with an input IN1 and an output OUT1 comprising transistors 610, 612, 614, and 616, and load capacitor 618; a second receiver 604 with an input IN2 and an output OUT2 comprising transistors 620, 622, 624, and 626, and load capacitor 628; and a third receiver 606 with an input IN3 and an output OUT3 comprising transistors 630, 632, 634, and 636, and load capacitor 638. Also shown in FIG. 6 are a voltage supply bus 650 and a ground bus 652. It should be understood that the busses may contain receivers for any desired number of bits (e.g., from 8 to 128 bits). Therefore, there may be any number (e.g., from 8 to 128) of receivers on the bus.

Also present are gain degeneration resistors 660, 662, 664, and 666 coupled to the first receiver; gain degeneration resistors 668, 670, 672, and 674 coupled to the second receiver; and gain degeneration resistors 676, 678, 680, and 682 coupled to the third receiver. Furthermore, coupling capacitors 684 and 686 couple together the first and second receivers; coupling capacitors 688 and 690 couple together the second and third receiver; and coupling capacitors 691 and 692 couple the third receiver with an adjacent receiver (not depicted in FIG. 6.)

Circuit 600 operates by tying the threshold of a receiver (e.g., receiver 602) to that of an adjacent receiver (e.g. buffer 604). The threshold of a receiver may increased if an adjacent receiver is transitioning from low to high, because sensitivity to low-level signals is not as important in these situations. Similarly, the threshold of an receiver may be decreased if an adjacent receiver is transitioning from high to low. This technique provides a spatial high frequency boost or equalization by increasing the receiver sensitivity to transitions when adjacent receivers switch in the opposite direction and reducing the sensitivity when adjacent neighbors switch in the same direction.

Note that a current-limiting device in accordance with various embodiments of the invention need not be a resistor. For example, in processes such as CMOS, it may be more convenient to use large transistors biased in the triode region as the current-limiting device in lieu of using a resistor. In this configuration, the transistor behaves in the same manner as a resistor and its dimensions are chosen appropriately.

Figure 9:
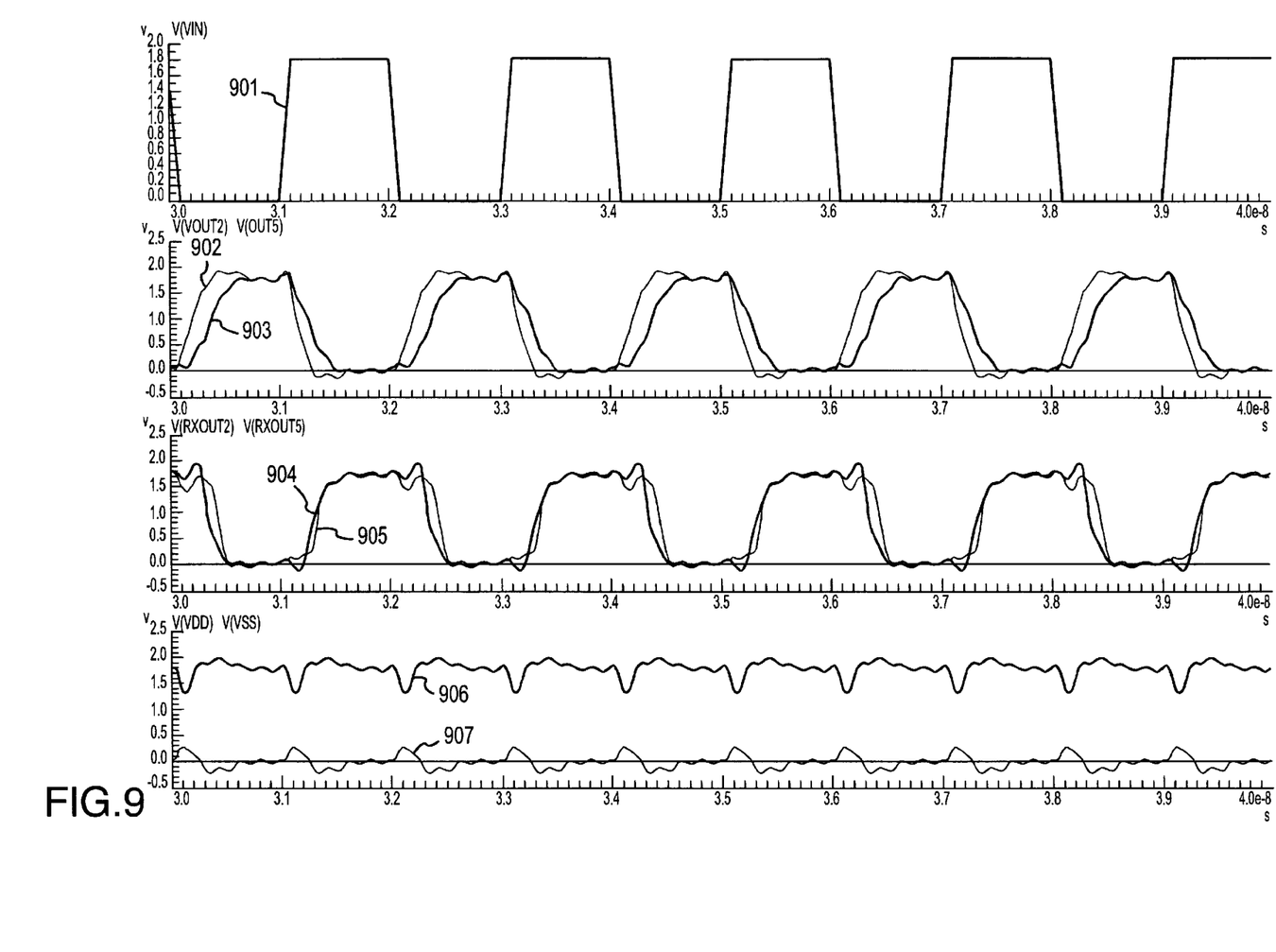
FIG. 9 illustrates exemplary waveforms from a data bus system of an exemplary embodiment of the present invention.

FIG. 9 illustrates exemplary waveforms for the same representative case discussed in connection with FIG. 8, but with spatially filtered drivers and receivers in accordance with the present invention, such as those represented by elements 431 and 441 of FIG. 4, replacing the traditional digital drivers and receivers.

Waveform 902 corresponds to the signal on trace 122, while waveform 903 corresponds to the signal on trace 125. Waveform 904 corresponds to output 112 and waveform 905 corresponds to receiver 115. It can readily be seen that waveforms 902 and 903 are very similar to waveforms 802 and 803, meaning that the signal traveling on the traces 122 and 125 are still affected by the above-described problems. However, it is also apparent that waveforms 904 and 905, which are ideally identical, are much closer timing-wise and closer in levels to each other than waveforms 804 and 805. This is due to the spatially filtered drivers and receivers, which alleviate a portion of the ground bounce and crosstalk encountered in traces 122 and 125.

Waveforms 906 and 907 depict the voltage at the voltage supply and ground bus. By comparison with waveforms 806 and 807 of FIG. 8, it can be seen that an embodiment of the present invention presents a more constant voltage level to the bus, which further alleviates the ground bounce and crosstalk problems discussed earlier.

The present invention has been described above with reference to preferred embodiments. However, those skilled in the art will recognize that changes and modifications may be made to the preferred embodiments without departing from the scope of the present invention.

The above description presents exemplary modes contemplated in carrying out the invention. The techniques described above are, however, susceptible to modifications and alternate constructions from the embodiments shown above. Other variations and modifications of the present invention will be apparent to those of ordinary skill in the art, and it is the intent of the appended claims that such variations and modifications be covered. For example, the present invention is not limited to certain sizes of data busses and can be extended to apply to a variety of different size busses.

Consequently, it is not the intention to limit the invention to the particular embodiments disclosed. On the contrary, the invention is intended to cover all modifications and alternate constructions falling within the scope of the invention, as expressed in the following claims when read in light of the description and drawings. No element described in this specification is necessary for the practice of the invention unless expressly described herein as "essential" or "required."

I claim:

1. A system of drivers for transmitting signals on a digital bus comprising:
   a first driver having a first discrete input and providing an output signal that is determined by a current switched in response to an input signal received at the first discrete input;
   a second driver in electrical parallel with said first driver and having a second discrete input and providing an output signal that is determined by a current switched in response to an input signal received at the second discrete input;
   a first passive current-limiting device coupled to a voltage supply and further coupled to said first and second drivers forming a first node;
   a second passive current-limiting device coupled to a ground and further coupled to said first and second drivers forming a second node;
   wherein, said first current-limiting device conducts current for a first transition; and
   said second current-limiting device conducts current for a second transition;
   whereby the voltage at said first and second nodes is varied solely by the switched current in said first and second drivers.

2. The system of claim 1 further comprising:
   a third current-limiting device coupled between said first driver and said second driver.

3. The system of claim 1 wherein
   said first current-limiting device comprises a resistor; and
   said second current-limiting device comprises a resistor.

4. The system of claim 1 wherein
   said first driver comprises a first plurality of inverter circuits coupled together; and
   said second driver comprises a second plurality of inverter circuits coupled together.

5. The system of claim 1 wherein
   each of said first and second drivers comprises a plurality of buffer circuits coupled together.

6. The system of claim 1 wherein:
   said first driver is configured to transmit a first bit of digital data; and
   said second driver is configured to transmit a second bit of digital data.

7. A system of drivers for transmitting signals on a digital bus comprising:
   a first driver;
   a second driver;
   each of said first and second drivers comprising a plurality of buffer circuits coupled together,
   a first current-limiting device coupled to a voltage supply and further coupled to said first and second drivers;
   a second current-limiting device coupled to a ground and further coupled to said first and second drivers;
   wherein, said first current-limiting device is operable for a first transition; and
   said second current-limiting device is operable for a second transition;
   each of said first and second drivers comprises a plurality of buffer circuits coupled together;
   a first, second, third, and fourth transistor, each comprising a source, a drain and a gate; wherein,
       said gates of said first, second, third, and fourth transistors are coupled together, forming an input node;
       said sources of said first transistor and said second transistor are coupled together and further coupled to said first current-limiting device;
       said sources of said third transistor and said fourth transistor are coupled together and further coupled to said second current-limiting device;
       said drains of said first, second, third, and fourth transistors are coupled together, forming an output node.

8. A system of drivers for transmitting signals on a digital bus comprising:
   a first driver;
   a second driver;
   a first current-limiting device coupled to a voltage supply and further coupled to said first and second drivers;
   a second current-limiting device coupled to a ground and further coupled to said first and second drivers;

wherein, said first current-limiting device is operable for a first transition; and said second current-limiting device is operable for a second transition;

said first driver being configured to transmit a first bit of digital data;

said second driver being configured to transmit a second bit of digital data; and a plurality of drivers coupled to said first current-limiting element and said second current-limiting element;

wherein each of said plurality of drivers is configured to transmit a single bit of digital data.

9. A method of transmitting digital data comprising:

using a spatially-filtered driver system to send the digital data on a data bus, wherein said spatially-filtered driver system is configured to compensate for spatial effects of the data bus;

sharing a passive current limiting device among a plurality of drivers connected in electrical parallel;

switching one or more of the drivers in said driver system into conducting current; and passing a larger current through said passive current limiting device when a larger number of drivers conduct current to achieve a first transition, thereby slowing down the transition speed.

10. The method of claim 9 further comprising:

receiving the digital data transmitted from said spatially-filtered driver via the data bus via a spatially-filtered receiver.

11. The method of claim 9 wherein said using step comprises:

providing a series of spatially-filtered drivers wherein said series of spatially filtered drivers comprises a first current-limiting element coupled to a power supply and a second current-limiting element coupled to a ground.

12. The method of claim 11 wherein:

said digital data comprises a plurality of bits; and each of said plurality of bits is transmitted by a spatially-filtered driver.

13. A method of receiving digital data comprising:

using a spatially-filtered receiver system to receive digital data from a data bus wherein said spatially-filtered receiver system is configured to compensate for spatial effects on the data bus;

sharing a passive current limiting device among a plurality of drivers connected in electrical parallel;

switching one or more of the drivers in said driver system into conducting current; and passing a larger current through said passive current limiting device when a larger number of drivers conduct current to achieve a first transition, thereby slowing down the transition speed.

14. The method of claim 13 wherein:

said digital data comprises a plurality of bits;

said spatially-filtered receiver system comprises a plurality of spatially-filtered receivers configured such that each of said plurality of bits is received by a spatially-filtered receiver.

15. A system of receivers for use in a digital bus comprising:

a first receiver;

a second receiver;

a first current-limiting device coupled to a voltage supply and further coupled to said first receiver;

a second current-limiting device coupled to a ground and further coupled to said first receiver;

a third current-limiting device coupled to a voltage supply and further coupled to said first receiver and said second receiver;

a fourth current-limiting device coupled to a ground and further coupled to said first receiver and said second receiver;

a first capacitor coupled between said first receiver and said second receiver and further coupled to said third current-limiting device; and a second capacitor coupled between said first receiver and said second receiver and further coupled to said fourth current-limiting device;

wherein said first and third current limiting devices are operable for a first type of transition; and said second and fourth current limiting devices are operable for a second type of transition.

16. The system of claim 15 further comprising:

a third receiver;

a fifth current-limiting device coupled to a ground and further coupled to said second receiver and said third receiver;

a sixth current-limiting device coupled to a voltage supply and further coupled to said second receiver and said third receiver;

a third capacitor coupled between said second receiver and said third receiver and further coupled to said fifth current-limiting device; and a fourth capacitor coupled between said second receiver and said third receiver and further coupled to said sixth current-limiting device.

17. A system of drivers for transmitting signals on a digital bus comprising:

a first driver;

a second driver coupled to said first driver;

a first passive current-limiting device coupled to a voltage supply and further coupled to said first driver such that any current flow between said voltage supply and said first driver flows through said current-limiting device when in an operating mode;

a second passive current-limiting device coupled to a ground and further coupled to said first driver such that any current flow between said around and said first driver flows through said current-limiting device when in an operating mode;

a third passive current-limiting device coupled to a voltage supply and further coupled to said first driver and said second driver such that any current flow between said voltage supply and said first driver and said second driver flows through said current-limiting device when in an operating mode;

a fourth passive current-limiting device coupled to a ground and further coupled to said first driver and said second driver such that any current flow between said ground and said first driver and said second driver flows through said current-limiting device when in an operating mode;

wherein, said first and third current-limiting devices are operable for a first type of transition; and said second and fourth current-limiting devices are operable for a second type of transition.

18. The system of claim 17 wherein said system is operable as a system of receivers.

19. The system of claim 17 further comprising:

a third driver coupled to said second driver;

a fifth current-limiting device coupled to a voltage supply and further coupled to said second driver and said third driver; and a sixth current-limiting device coupled to a ground and further coupled to said second driver and said third driver.

20. A system of drivers for transmitting signals on a digital bus comprising:

a first driver;

a second driver coupled to said first driver;

a first current-limiting device coupled to a voltage supply and further coupled to said first driver;

a second current-limiting device coupled to a ground and further coupled to said first driver;

a third current-limiting device coupled to a voltage supply and further coupled to said first driver and said second driver;

a fourth current-limiting device coupled to a ground and further coupled to said first driver and said second driver;

wherein, said first and third current-limiting devices are operable for a first type of transition; and said second and fourth current-limiting devices are operable for a second type of transition;

wherein each of said first and second drivers comprises:

a first, second, third, and fourth transistor, each comprising a source, a drain and a gate; wherein, said gates of said first, second, third, and fourth transistors are coupled together, forming an input node;

said sources of said first transistor and said second transistor are coupled together and further coupled to said power supply;

said sources of said third transistor and said fourth transistor are coupled together and further coupled to said ground;

said drains of said first, second, third, and fourth transistors are coupled together, forming an output node.

* * * * *